UNITED STATES PATENT OFFICE.

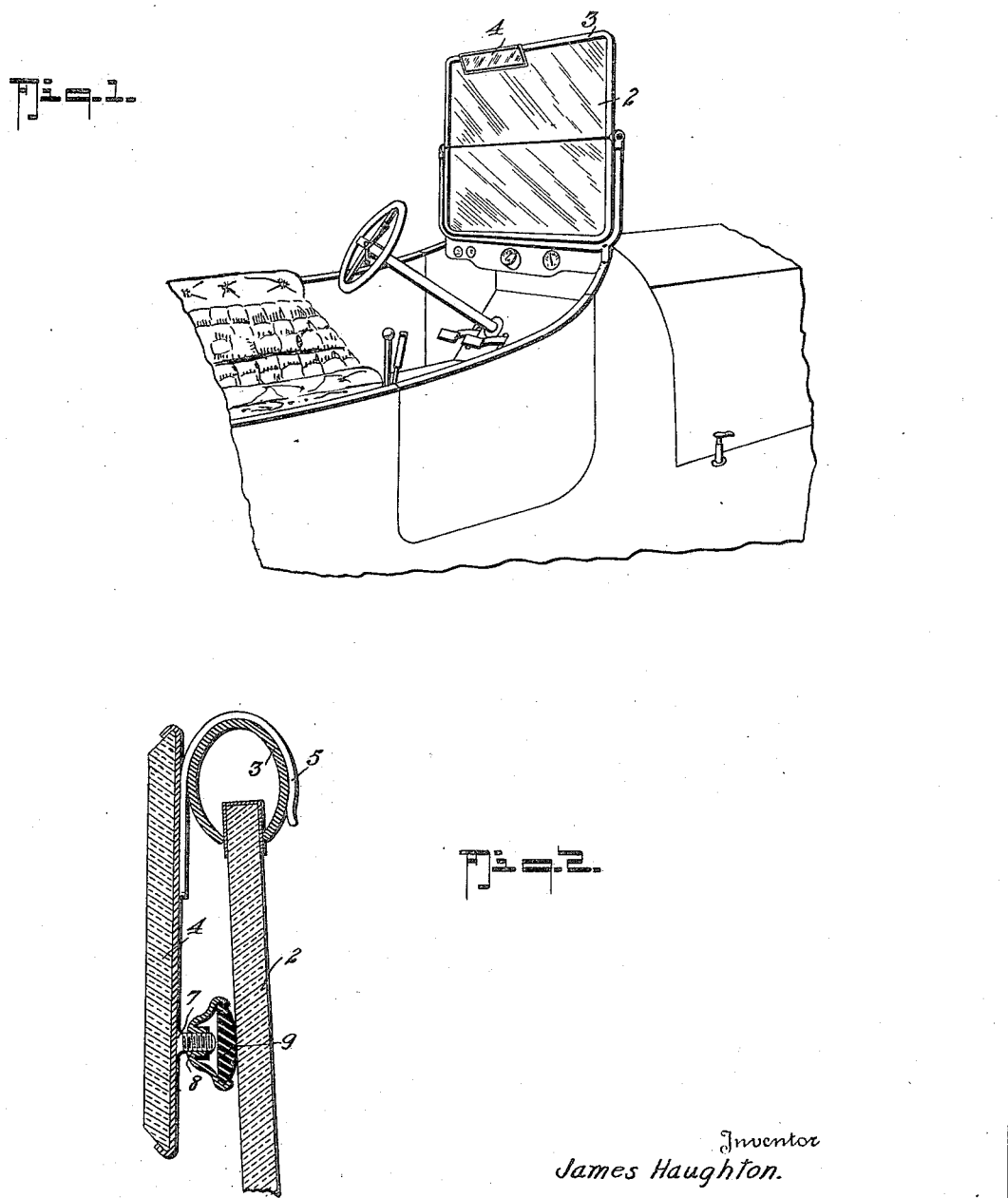

JAMES HAUGHTON, OF VANCOUVER, BRITISH COLUMBIA, CANADA.

BACK-VIEWING MIRROR FOR AUTOMOBILES.

1,424,405.  Specification of Letters Patent.  Patented Aug. 1, 1922.

Application filed April 22, 1921.  Serial No. 463,461.

*To all whom it may concern:*

Be it known that I, JAMES HAUGHTON, citizen of the Dominion of Canada, residing at Vancouver, in the Province of British Columbia, Canada, have invented certain new and useful Improvements in Back-Viewing Mirrors for Automobiles, of which the following is a specification.

This invention relates to a back viewing mirror designed for attachment to the upper edge of the windshield of an automobile to afford the driver a view of following vehicles.

The improvements are directed to the means for connecting the mirror to the windshield frame in a manner that it may be readily connected or removed and to a means for adjusting the plane of the mirror to the requirements of the driver to afford the best view of the road behind.

The invention is fully described in the following specification, reference being made to the drawings by which it is accompanied, in which:

Fig. 1 is a perspective view of the mirror as connected to the windshield.

Fig. 2, an enlarged vertical section of the mirror and that portion of the windshield to which it is attached, showing also one of the screws by which the plane of the mirror may be adjusted.

In these drawings 2 represents the glass and 3 the top border frame of the windshield. To the top border frame 3 a relatively narrow elongated mirror 4 mounted within a suitable frame is suspended by hooks 5 secured to the back of the mirror adjacent its upper edge.

These hooks 5 are made of metal strip bent to pass freely over the thickness of the windshield frame 3 and exert a slight resilient grip thereon below the larger horizontal dimension, where the frame is round or oval in cross section.

Secured to the back of the mirror 4 adjacent the lower edge and about the mid-length is a screwed stud 7 on which stud a nut 8 is threaded, in the head of which is a pad 9 of rubber or the like having a convex outer face.

This rubber pad 9 supports the lower edge of the mirror against swinging on the frame, prevents rattle, and by virtue of the screw enables the plane of the mirror face to be adjusted to what is required to afford a satisfactory view of the road behind.

While one screw adjusted pad is all that is necessary, if preferred two may be used, one near each end.

Owing to the form of the hooks 5 the mirror may be readily applied to and removed from the wind screen, and is easily adjusted to each driver's requirements.

Having now particularly described my invention, I hereby declare that what I claim as new and desire to be protected in by Letters Patent, is:

1. A back viewing mirror for the windshield of an automobile, comprising the combination with a relatively narrow mirror, of hooks secured to the back thereof adjacent the upper edge, said hooks being downwardly directed and adapted to pass on to the frame of the wind-shield and exercise a resilient hold thereof, and a screw adjustment between the back of the mirror and the adjacent face of the windshield said mirror being of an area to completely cover said hooks and said adjusting means whereby when the mirror is in place on the windshield said hooks and adjusting means will not be visible from the front of the mirror.

2. A back viewing mirror for the windshield of an automobile, comprising the combination with a relatively narrow mirror having a hook secured to the back adjacent each end of the upper edge, said hooks being downwardly turned and adapted to pass on to the windshield frame and exercise a resilient hold thereof, a screw secured to the back of the mirror adjacent the lower edge to project toward the windshield, and a nut threaded on the screw and having a head of rubber or the like to bear against the windshield said mirror being of an area to completely cover said hooks and said adjusting means whereby when the mirror is in place on the windshield said hooks and adjusting means will not be visible from the front of the mirror.

In testimony whereof I affix my signature.

JAMES HAUGHTON.